UNITED STATES PATENT OFFICE.

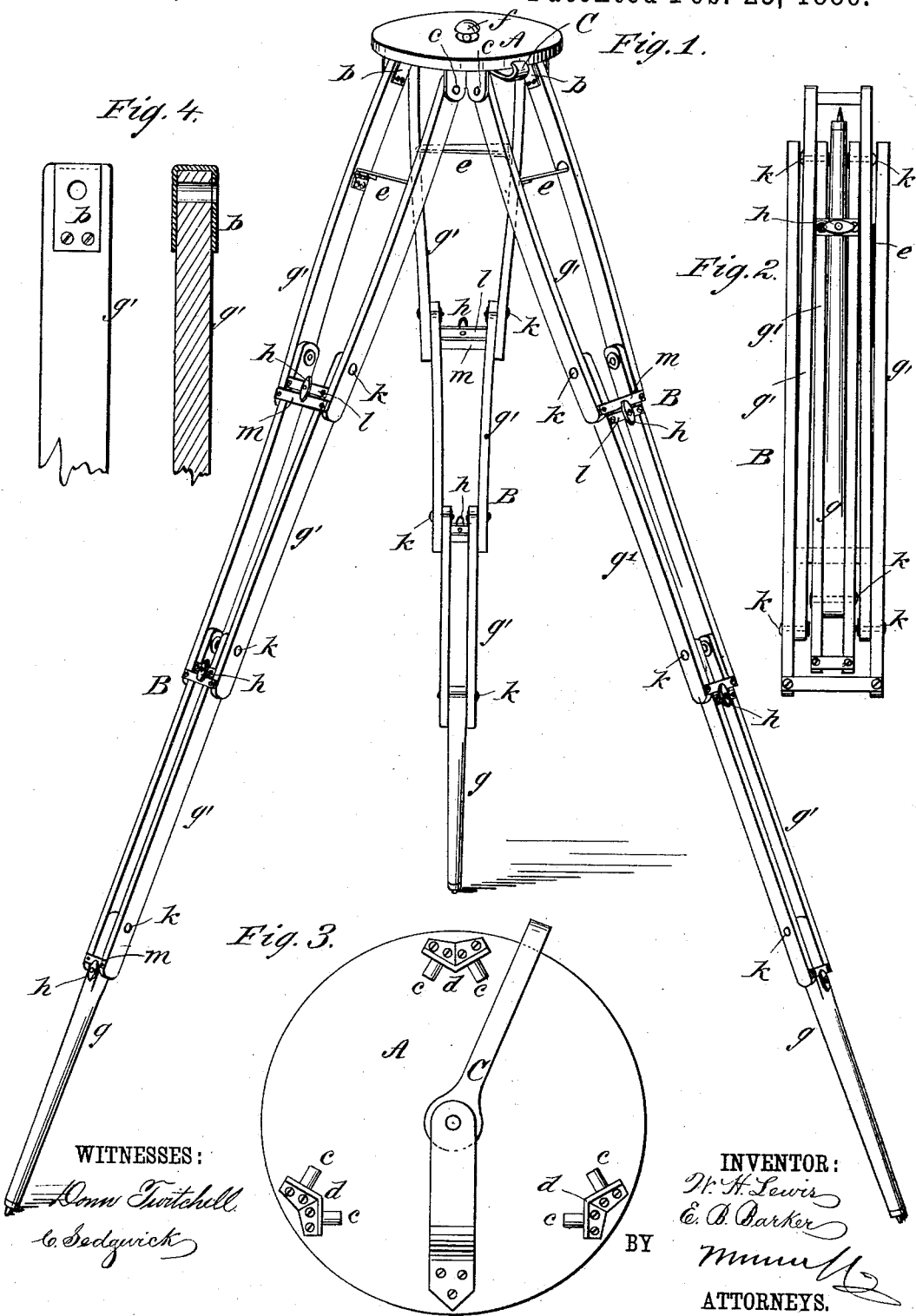

WILLIAM H. LEWIS AND ERASTUS B. BARKER, OF NEW YORK, N. Y., ASSIGNORS TO E. & H. T. ANTHONY & CO., OF SAME PLACE.

STAND FOR PHOTOGRAPHIC CAMERAS.

SPECIFICATION forming part of Letters Patent No. 336,815, dated February 23, 1886.

Application filed August 19, 1885. Serial No. 174,803. (No model.)

*To all whom it may concern:*

Be it known that we, WILLIAM H. LEWIS and ERASTUS B. BARKER, of New York city, in the county of New York and State of New York, have invented new Improvements in Stands for Photographic Cameras, &c., of which the following is a full, clear, and exact description.

This invention consists in a camera tripod or stand of novel construction, substantially as hereinafter shown and described, and whereby the legs, which are composed of three or more sections, secure a more regular tapering and firmer support for the stand when set up, and said legs may be packed away in a smaller space or compass for transportation or storage purposes when the stand is knocked down.

Reference is to be had to the accompanying drawings, forming a part of this specification, in which similar letters of reference indicate corresponding parts in all the figures.

Figure 1 represents a view in perspective of a camera-stand embodying our invention when the same is set up. Fig. 2 is a longitudinal face view of one of the sectionally-constructed legs when detached and folded up; Fig. 3, an under view of the top plate or table portion of the stand with certain attachments for securing the legs to it and for holding the camera on the stand, and Fig. 4 a side view and a longitudinal section at right angles thereto of one of the upper leg-sections in part.

A is the top plate, board, or table portion of the stand upon which the camera is to be detachably secured, and B B B are the legs of the stand, which are detachably connected with the top board, A, by springing their uppermost sections to engage by perforated caps $b$ on them with pins $c\ c$ on metal attachments $d$, secured to the under side of the board A, and afterward holding the sides of such uppermost leg-section as thus sprung by shutting down or closing a hinged brace, $e$, as usual.

Pivoted to an arm or bracket on the under side of the top board or plate, A, is a cam-lever, C, arranged to work under or against a fixed cam, and serving to engage or disengage a bolt, $f$, with or from the camera for the purpose of holding the camera down on the stand or of permitting of its being detached therefrom; but as this device is more immediately connected with the camera we make it the subject of a separate application for patent in connection with a camera.

Each leg B of the stand is composed of three or more lengths or sections pivoted and arranged when the leg is detached from the top board, A, to shut up or fold one within the other, instead of being composed, as heretofore, of a single tapering upper section and a single lower folding solid section pivoted thereto and secured, when the leg is extended, by a button on the lower section engaging with or over a plate on the upper section.

In the legs of our improved stand only the lower section, $g$, of each leg has the button $h$ thus directly pivoted to it for engagement over a plate, $m$, on the slotted leg-section above it, and the upper portion of the leg is composed of not merely one open or slotted section, but of a series of two or more pivoted slotted sections, $g'$. These slotted sections are of different widths, each succeeding upper section being of greater width than the one next below it, and of such width as to receive, when the leg is folded, its attached lower section united by a pivot, $k$, up within it, as shown in Fig. 2. This not only provides for the legs of the stand when detached being more compact, so that they may be transported or stored away in a smaller space or compass, but each leg, when extended, will present a more gradual or regular taper from top to bottom, and thus give a firmer support by reason of the varying widths of the several slotted upper sections and comparatively short length of the lower section. The several upper slotted leg-sections, $g'$, are locked or engaged with each other when the legs are extended by a button, $h$, pivoted to a plate, $l$, and engaging over another plate, $m$, the one plate, $l$, being fast on and arranged across the upper end portion of an upper leg-section, and the other plate, $m$, being fast on and arranged across the lower end of the next upper leg-section above it. The plate $l$, carrying the button, may be arranged above or below the plate $m$, as shown at the right and left hand of Fig. 1.

A tripod or stand having its legs constructed as described may, if desired, be used for other purposes than holding a camera.

Having thus described our invention, we claim as new and desire to secure by Letters Patent—

1. In a camera or other stand, the legs of the stand composed of three or more folding sections pivoted to each other, each upper section being of greater width than the section next below it, and each of the upper sections being of slotted or open construction to receive its attached lower section within it when the leg is folded and being arranged to work from or around the same axial center on opposite sides, substantially as specified.

2. The combination, with the top board or table portion, A, of the stand, of the detachable legs B, each of which is composed of two or more slotted upper sections, $g'$, of varying width, as described, and of a lower section, $g$, and the several sections being pivoted to each other and adapted to fold one within the other, essentially as shown and described.

3. The combination, with the slotted pivoted and folding sections $g'$ of the legs, of varying width, as described, of the plates $l\,m$ and buttons $h$, substantially as specified.

WILLIAM H. LEWIS.
ERASTUS B. BARKER.

Witnesses:
EDGAR TATE,
C. HANFORD HENDERSON.